United States Patent [19]
Crandall

[11] 3,989,627
[45] Nov. 2, 1976

[54] REMOVABLE GAS DIFFUSER AND APPARATUS THEREFOR

[75] Inventor: Robert E. Crandall, Greendale, Wis.

[73] Assignee: Envirex Inc., Waukesha, Wis.

[22] Filed: Sept. 30, 1975

[21] Appl. No.: 618,172

[52] U.S. Cl. .............................. 210/220; 261/122; 261/DIG. 47
[51] Int. Cl.² ............................................ C02C 1/12
[58] Field of Search ............ 210/14, 15, 220, 221 R; 239/145, 166, 280, 280.5, 281; 261/121 R, 122, 123, 124, DIG. 47

[56] References Cited
UNITED STATES PATENTS

| | | | |
|---|---|---|---|
| 2,527,097 | 10/1950 | Katow | 261/DIG. 47 |
| 3,116,021 | 12/1963 | Born | 239/166 X |
| 3,160,685 | 12/1964 | Chase | 261/124 |
| 3,174,733 | 3/1965 | Chase | 261/DIG. 47 |
| 3,339,901 | 9/1967 | Walker | 261/124 |
| 3,785,629 | 1/1974 | McKinney | 261/122 |
| 3,864,441 | 2/1975 | Suzuki | 261/122 |

Primary Examiner—Thomas G. Wyse
Assistant Examiner—Robert H. Spitzer

[57] ABSTRACT

A diffuser assembly of the general type for use in a municipal sewage treatment plant is of plastic and/or resin construction and includes spaced parallel or dual hanger pipes between the two rotary joints. The hoist arm extends between these hanger pipes to reach the lift joint. Opposed detent blocks between and engaging the dual pipes cooperate with a steady bracket into which the assembly is locked with a toggle action.

10 Claims, 11 Drawing Figures

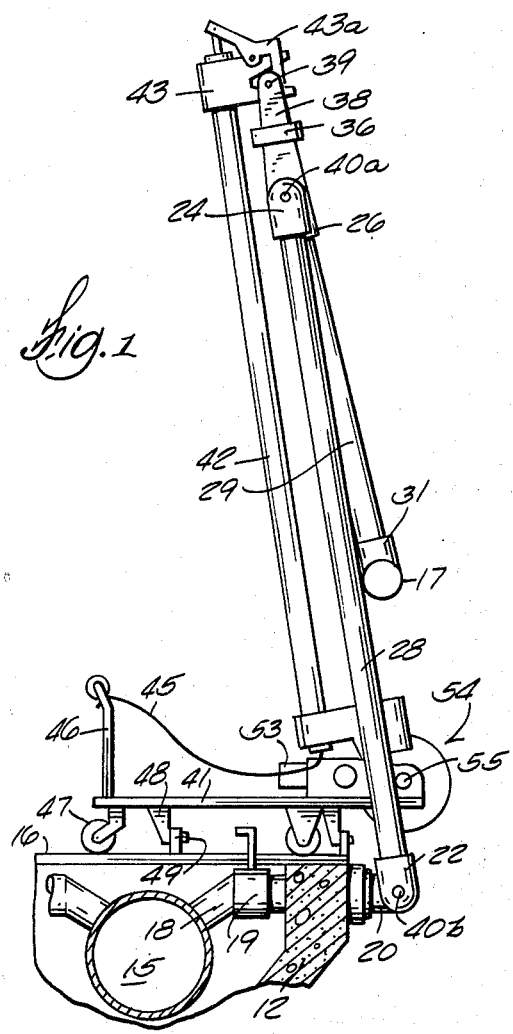
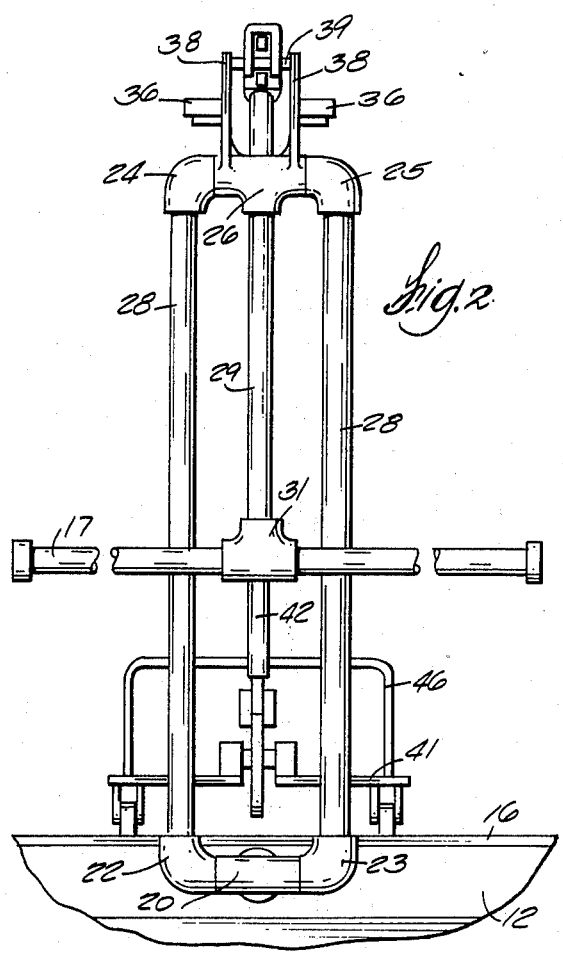
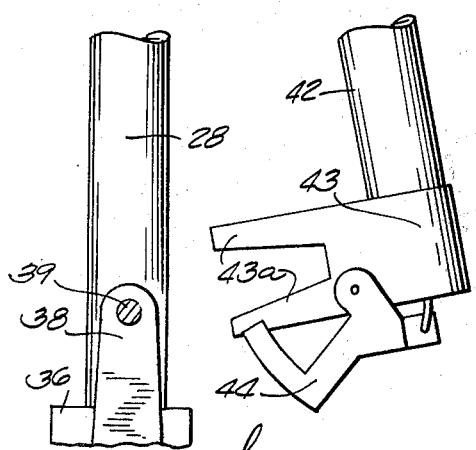
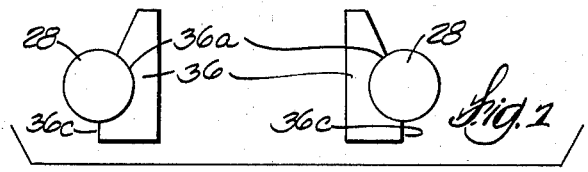
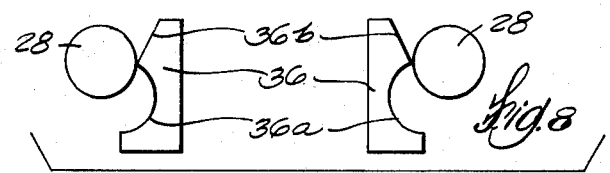
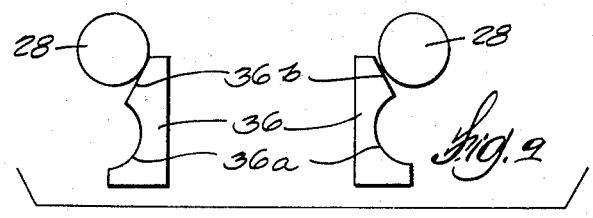

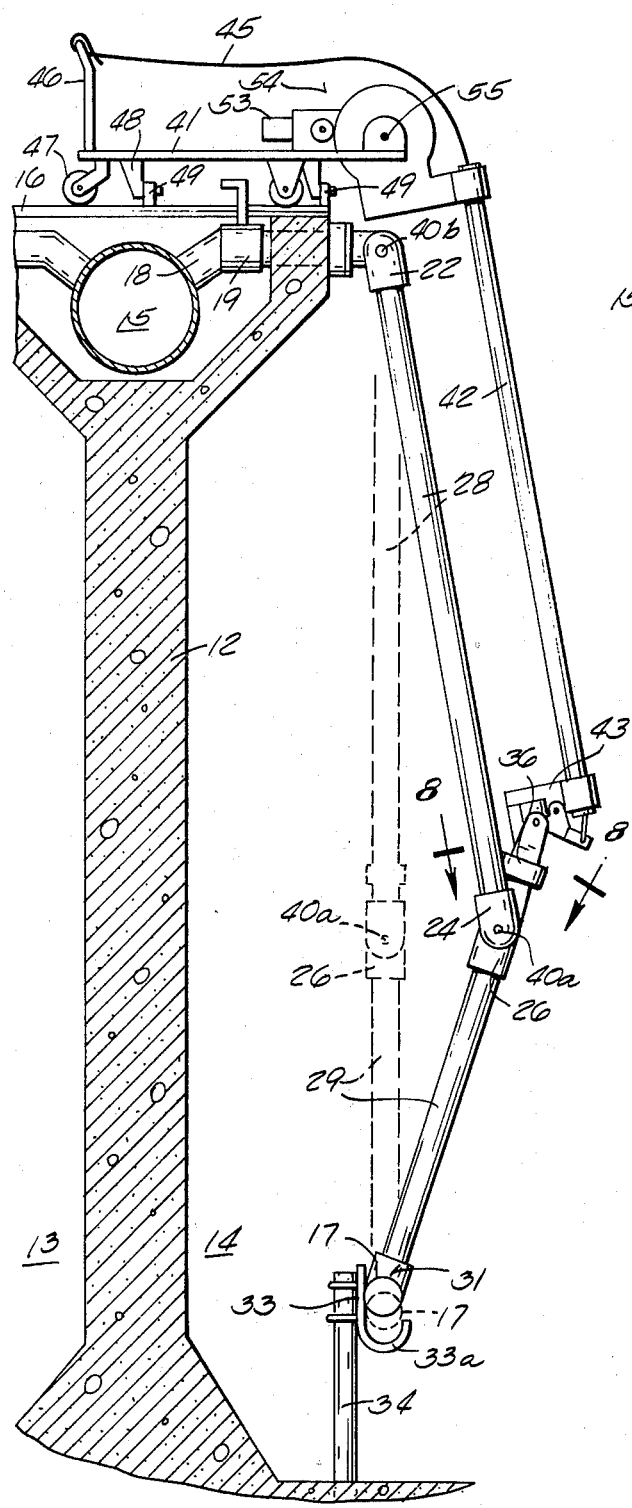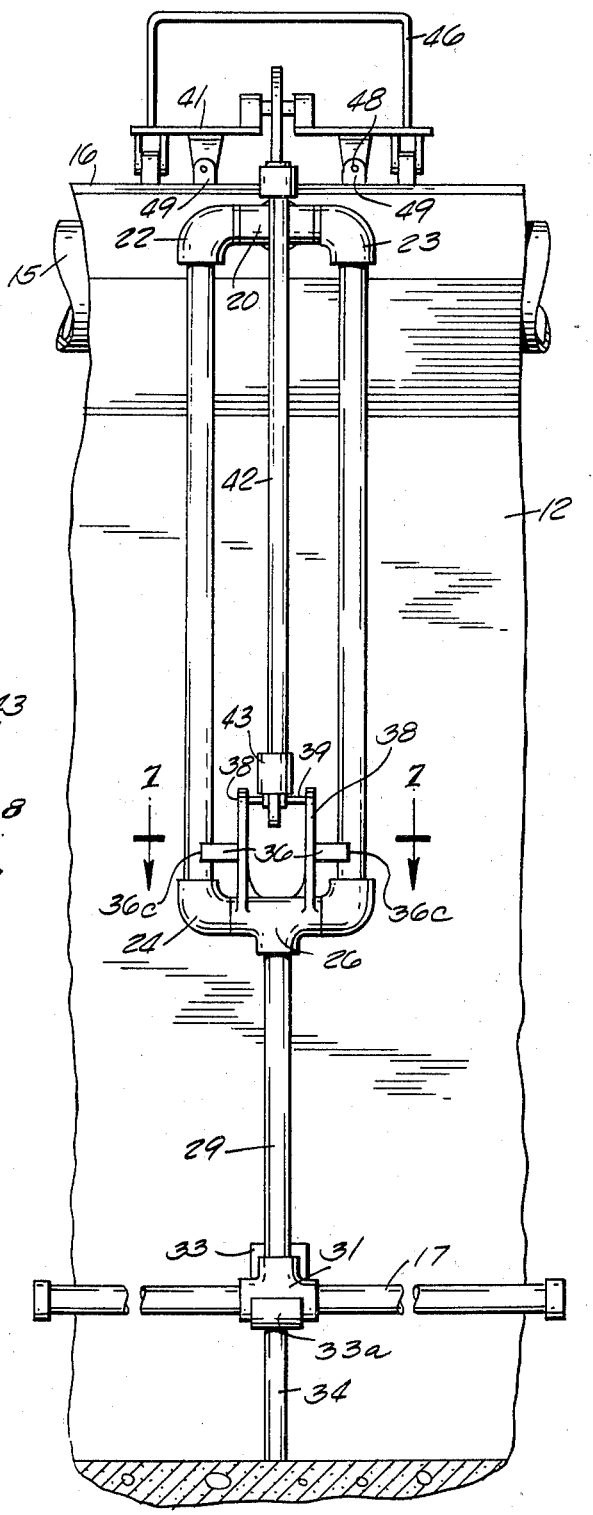

REMOVABLE GAS DIFFUSER AND APPARATUS THEREFOR

CROSS REFERENCE TO RELATED APPLICATION

The subject of this application relates to the invention of the same inventor for which he has filed on Aug. 12, 1974 his application entitled Swing Pipe Assembly for Removable Gas Diffuser, Ser. No. 496,573, now U.S. Pat. No. 3,920,186. Said application and this application are commonly owned.

BACKGROUND OF THE INVENTION

Aeration diffusers particularly as they are used in the treatment of sewage by aerobic digestion require periodic removal for maintenance.

The construction of the usual aeration tanks includes air supply mains and walk-ways along the top sides of the walls between tanks. Horizontal headers along a wall of each tank carry the submerged diffusers and are connected by vertical hanger pipes to the air supply mains. Rotary joints in the hanger pipes and a suitable hoist allow the headers to be lifted from the tank to a convenient working position above the walkway for inspection maintenance or replacement of the diffusers.

Heretofore, each rotary jointed hanger pipe assembly has been of steel construction such that its weight suitably keeps it steady in its lower, operating position in the tank. However, lifting such weight requires a sturdy hoist which is difficult to maneuver or man-handle along the walkway. In particular however, the use of plastics and resins instead of metals now offers great advantages as to cost and weight, excepting that the light weight of such equipment also now requires provisions for holding the header in the tank in its operating position.

SUMMARY OF THE INVENTION

The rotary joints of the diffuser assembly include a wall joint and a lift joint. Spaced parallel or dual pipes extend from the upper wall joint to the lift joint. A lifting bracket extends upwardly from the lower pipe and includes detent blocks which engage the dual pipes to control the movement of the header and its seating in a lower bracket within the tank. The flexibility of the dual pipes is utilized to provide the locking effect which secures the header in the bracket in its operative position within the tank. A lift apparatus includes an arm which latches with the lift bracket and first disengages the detent blocks and then elevates the assembly. Relowering of the assembly is effected essentially in the same order but with some difference.

BRIEF DESCRIPTION OF THE SEVERAL VIEWS OF THE DRAWING

FIG. 1 includes in section a portion of the wall between two aeration tanks. The hoist and the header are shown in the upper position for servicing of the diffusers. The diffusers are carried by the header but are not shown.

FIG. 2 is a front elevation of the apparatus shown in FIG. 1.

FIG. 3 shows in section the wall between the two tanks and the diffuser header leaving or approaching the bracket in the tank at its lower position. The lower rotary joint in its lowermost position is shown in broken lines.

FIG. 4 is a front elevation of the apparatus shown in FIG. 3 and with the diffuser header in its lowermost and operative position.

FIG. 7 is an enlarged section taken on line 7—7 of FIG. 4 and shows the detent blocks in full engagement with the dual pipes.

FIG. 8 is an enlarged section taken on line 8—8 of FIG. 3.

FIG. 9 is a view similar to FIGS. 7 and 8 and shows the dual pipes pushed apart by the detent blocks.

FIG. 11 is an enlarged view of the end of the lift arm of the hoist with the latch in the open position and approaching or leaving the lift rod.

DESCRIPTION OF THE PREFERRED EMBODIMENT

Figure 10:
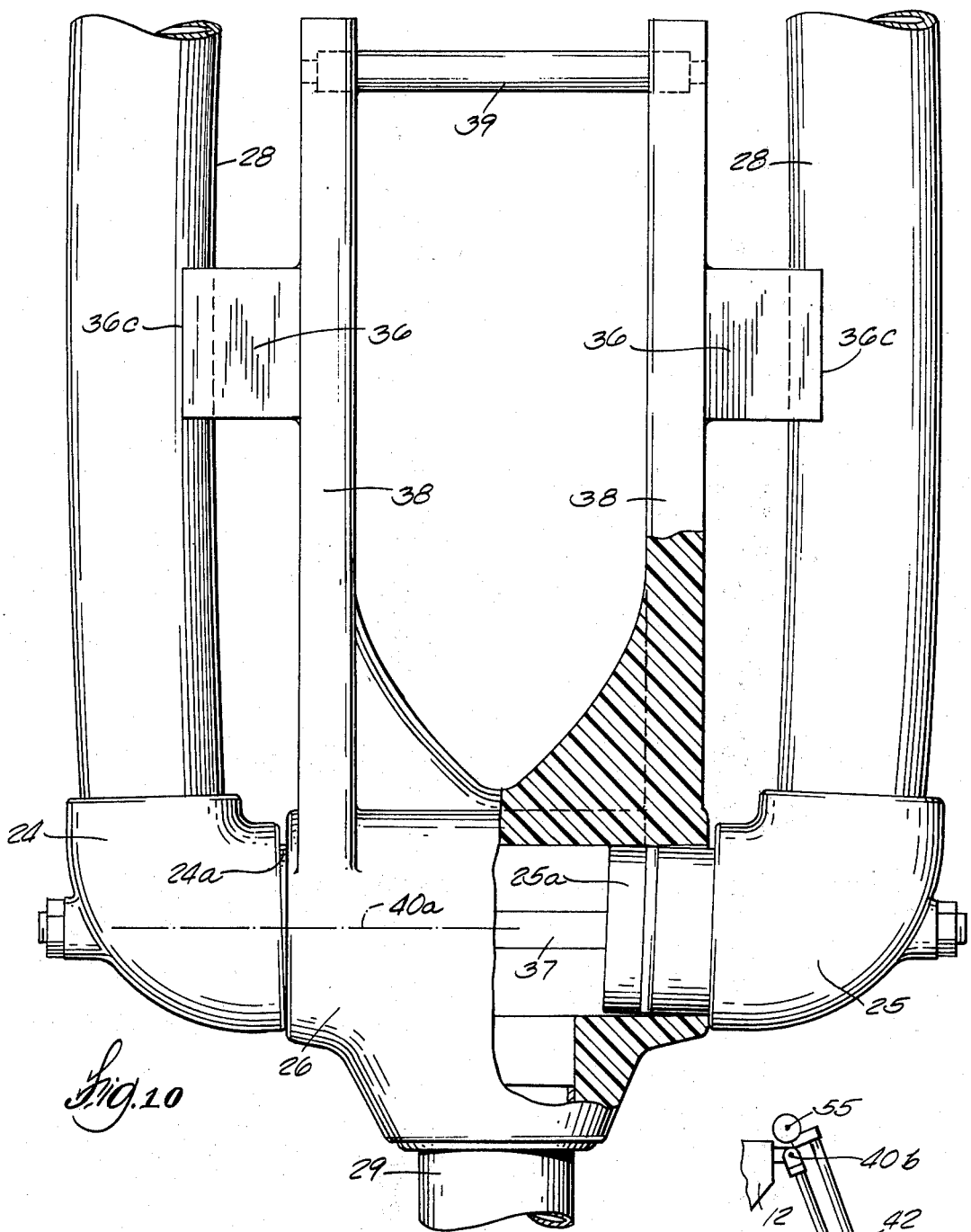
FIG. 10 is an enlarged view of the detent means of FIG. 6 and shows the structural bending which is caused by the interaction shown in FIG. 9.

The concrete wall 12 between the two aeration tanks 13 and 14 carries the air supply main 15. This main supplies air to all the diffuser headers which are disposed in the two tanks on opposite sides of wall 12. The walk-way 16 forms the top side of wall 12 for access to the headers. Only the one diffuser header 17 is shown in the drawings. It is located in tank 14 and is connected to the lateral 18 extending from air supply main 15 as will be described. Lateral 18 is controlled by the valve 19 and is connected to the air supply main 15 located below walkway 16.

The present invention is directed to the mechanism for raising and lowering header 17 and also includes in part the subject matter of the copending application referred to (Ser. No. 496,573) wherein the upper hanger pipe comprises two pipes and each rotary joint comprises a tee and two rotatable elbows, as will be immediately described.

As shown best in FIGS. 2 and 4, the tee 20 fixed to and extending from wall 12 has its lateral connected to the lateral 18 from air main 15. Tee 20 is part of the upper rotary joint which further includes the elbows 22 and 23. The lower rotary joint includes the elbows 24 and 25 and the intermediate tee 26. The dual pipes 28 and 25 respectively join the elbows 22 and 24 and the elbows 23 and 25 and comprise the upper hanger pipes. The lower hanger pipe 29 connects tee 26 of the lower rotary joint and the tee 31 of header 17. It is noted that the axes of the rotary joints referred to and the header 17 are horizontal and parallel to wall 12 as will be further described. The diffusers carried by header 17 are not shown; they may be of any type. The opposite ends of header 17 are closed but may be provided with suitable means for draining, not shown.

In the lowermost, operating position of header 17, the header is secured laterally by the steady bracket 33 suitably supported within the tank. The support as shown in FIGS. 3 and 4 is illustrative only and includes the upright 34 standing from the floor of tank 13. Bracket 33 is bolted to the upright member 34 so as to be adjustable vertically if necessary and includes the saddle 33a as shown in FIG. 3.

According to the present invention, and as will be further described, the upper and lower hanger pipes are held in their fully extended downward position by the two detent blocks 36 which are located between and which respectively engage pipes 28. The single pipe 29 is provided with a lift bracket which carries the detent blocks 36. This bracket comprises the two spaced arms 38 extending upwardly from tee 26 and the horizontal rod 39 which joins the upper ends of arms 38.

In FIG. 10 the pipes 26 are shown as they are pushed apart by the blocks 36 as will be further described hereinafter. FIG. 10 will be referred to as follows in describing the construction of both the upper and lower rotary joints and in identifying their axis. Elbows 24 and 25 include horizontal extensions 24a and 25a respectively which are turnable in the aligned horizontal ends of the tee. Their axis is the axis 40a of the lower rotary joint. The elbows 24 and 25 are joined by the tie rod 37 which extends through tee 26 on said axis.

The upper elbows 22 and 23 are of a similar construction and are similarly rotatable respecting the tee 20. The upper rotary joint comprising tee 20 and elbows 22 and 23 is disposed to have a similar horizontal axis extending centrally through the laterals of the tee as at 40b. As previously noted, axis 40b and 40a are horizontal and parallel to wall 12.

In the preferred embodiment shown the header 17 and pipes 28 and 29 are of a resin-bound glass filament wound construction and tees 20, 26 and 31 and elbows 22—25 are of a molded plastic construction. The elbows and pipes 28 are bonded together; the tees 26 and 31 are bonded to the ends of pipe 29. This preferred construction is generally of lower cost than constructions of metal which must be corrosion resistant such as brass, or galvanized steel. The required flexibility of pipes 28 would not be provided if they were of metal.

The header 17 with hanger pipes 28 and 29 and bracket 33 are installed in tank 14 while the tank is dry. That is the upper tee 20 may be connected to lateral 18 with header 17 already connected to pipe 29 and with pipe 29 connected to pipes 28 so that the entire assembly hangs from lateral 18. In this position, the pipes 28 are engaged in the recesses 36a by detent blocks 37 as shown in FIG. 7. Also, the tee 26 should be at some vertical position alongside of brace 34 and on the side thereof remote from wall 12. The bracket 33 is then adjusted vertically on brace 34 so that the tee 26 fits in the saddle 33a of the bracket. It should be understood, of course, that the overall dimensions of similar assemblies would be identical and that it should only be necessary then to set bracket 33 at some predetermined distance below lateral 18.

With the header 17 installed as described, and all the other headers similarly installed, of course, the tank 14 is ready for filling and operation. The header 17 is held securely in place against lateral movement, that is toward or away from wall 12, by saddle 33a. Upward movement and any pivotal movement is prevented by the connection of tee 20 to lateral 18 which is well fixed to wall 12. That is, the dual pipes 28 and lower pipe 29 are part of a single, rigid structure. Their relative pivotal movement is adequately prevented by the arms 38 carrying detent blocks 36 which are engaged with pipes 28. The pipes 28 are rigid, of course, in the usual sense, but it is their nominal flexibility which allows the header 17 to be lifted from the tank.

The apparatus for raising and lowering header 17 includes the cart 41 having a hoist arm 42. The arm 42 is preferably tubular and is adjustable in length if desired. At its outer end the arm carries the latch 43 which is shown in the open position in FIG. 11. The latch 43 includes the spaced fingers 43a and the pivoted hook 44 which may be variously operated. As shown, a cable 45 is provided and extends from hook 44 through arm 41 and is tied to the handle 46 at the rear end of the cart 41.

The hoist arm 42 is pivotally supported by the forward end of cart 41 which may be positioned above the axis 40b of the upper rotary joint which is formed by tee 20 and elbows 22 and 23.

The cart 41 is provided with the castered wheels 47 so that it may be readily moved along walk-way 16 and positioned at each diffuser assembly. As shown, the locking pins 48 of the cart are engageable with the stationary lugs 49 fixed to wall 12. Similar lugs are positioned at each header location to secure the cart as required. The hoist arm 42 is raised and lowered by an electric motor 53 through a reduction gearing or by a hydraulic torque converter and suitable gearing, all indicated generally by the numeral 54. The electric power for motor 53 is generally that supplied to the sewage treatment plant and is provided by extension cables, not shown, laid along the walkway 16. A separate generator is also used where more convenient.

When the assembly is installed in tank 14 as in FIG. 4, the cart 41 is pushed into position generally with the hoist arm 42 in its upright position as the arm appears in FIG. 1. When the cart 41 is suitably positioned as described and secured by locking pins 48, the hoist arm 42 is lowered. It should here be noted that the pivot bearing axis of the hoist arm is indicated by the numeral 55 and is located a preselected distance above the upper rotary joint axis 40b. The rod 39 is similarly disposed the same preselected distance above the axis 40a of the lower rotary joint so that the hoist arm 41 and the dual pipes 28 are substantially in parallel relation.

As the arm 42 is lowered, that is, it is rotated clockwise as shown, about axis 55, the latch 43 is opened such as by pulling cable 45. As hoist arm 42 approaches its downward position, the latch 43 approaches rod 39 so that the rod enters the space between fingers 43a. Suitable means, not shown, is provided to reclose latch 43 upon release of cable 45. The hoist arm 42 is then in position to lift the diffuser 17 from tank 13. Before doing so, it is preferable that the air supply to header 17 be turned off by closing valve 19.

As the hoist arm 41 swings in the counter-clockwise direction as viewed in the drawings and around axis 55, the arm pulls rod 39 to the right, or away from wall 12. The initial movement of diffuser header 30 is only vertical because header tee 31 is restrained from any other movement by the saddle 33a of bracket 33. (See FIG. 3)

The first stage in the lifting sequence proceeds as follows with reference to FIG. 3. The pipes 28 in moving from the position shown in broken lines, pivot about axis 40b and the lower pipe 29 pivots about axis 40a as this axis moves in an arc away from wall 12. The movement of pipes 28 relative to pipe 29 causes the detent blocks 36 to push pipes 28 apart as shown in FIG. 8. When the pipes 29 have cleared the recesses 36a of blocks 36 and are on the cam faces 36b of the blocks, the tee 31 (shown in broken lines in FIG. 3) becomes disengaged from bracket 33, and the resilience of pipes 29 pushed against cams 36b cause pipe 29 to rotate about axis 40*b* relative to pipes 28 and to such extent as to raise tee 31 so that it clears the saddle 33*a*. This relative movement is also assisted by the buoyancy of header 17. As the entire assembly moves around axis 40*b* to the position shown in full lines in FIG. 3, the detent blocks 36 generally remain in contact with pipes 28. In the next stage upward, the pipes 28 pass through the horizontal positions shown in FIGS. 6 and 5 and the pipe 29 is securely held in a vertical position by hoist arm 42.

The upper limit of the lifting cycle is shown in FIG. 1 and is readily some number of degrees past a true vertical position so that the header 17 is placed somewhat nearer to or over the walkway 16 for better access. As shown, the end of cart 41 and the gearing mechanism 54 fits between pipes 28 and the header 17 lies across the pipes 28 as shown in FIG. 2.

After servicing of the air diffusers, not shown, which are attached to header 17, the header is relowered into tank 14 by the electric motor 53. The hoist arm 42 swings clockwise about axis 55 and initially pushes rod 39 to the right as viewed in FIG. 1, or outward over tank 14. The weight of header 17 generally holds pipe 29 in the vertical position and so that the header will move readily away from pipes 28.

Figure 5:
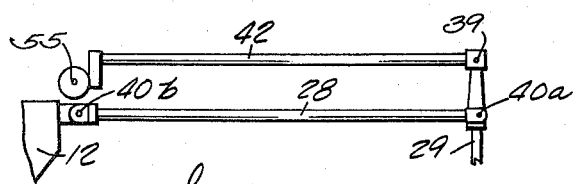
FIG. 5 is of reduced scale and shows the hoist arm and the hanger pipes in their furthest horizontally extended position.

The first stage in the downward movement is shown in FIG. 5 and is generally just after the header 17 has entered the water or sewage. Preferably the air supply should be turned on partially so that the diffusers carried by the header 17 remain unclogged. The buoyancy of the header 17 now in the water or sewage here operates with an effective lever arm represented by the distance from axis 40*b* to the axis 40*a* of the two rotary joints. The hoist arm 42 here must apply maximum downward force to rod 39.

Figure 6:
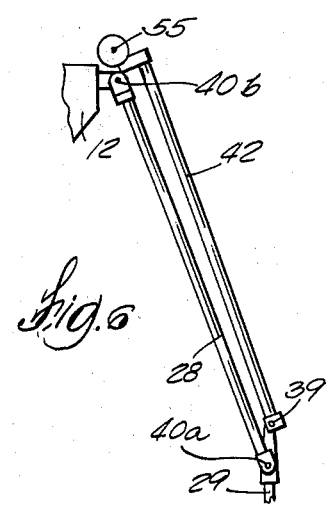
FIG. 6 is a view similar to FIG. 5 and shows the approximate relative positions of the hanger pipes when the detent blocks engage or disengage the dual upper hanger pipes.

In approaching the position shown in FIG. 5 and in moving downwardly, the buoyancy of the header 17 causes it to have a great tendency to move away from under rod 39. The hoist 42 and pipes 28 are here required to hold pipe 29 in a near vertical position and until reaching the second stage which is shown in FIG. 6.

In the second stage proceeding downwardly, the cams 36*b* of detent blocks 36 engage pipes 29 as shown in FIG. 9 and prevent relative rotation of pipe 29 respecting pipes 28 about axis 40*a* until the tee 31 has engaged bracket 33 above the saddle 33*a*. The assembly is then in the third stage which is shown in FIG. 3 (full lines).

Further rotation of hoist arm 42 about axis 55 now pushes rod 39 toward wall 12 and the detent blocks 36 are pushed between pipes 28. The pipes are pushed apart by the cams 36*b* of the blocks and at the same time the tee 31 moves downwardly into saddle 33*a*. When tee 31 is within the confines of saddle 33*a*, but not fully, the pipes 28 enter the recesses 36*b* of the block. Their entry is effected by the resilience of the pipes and occurs with something of a snap-action. The pipes 28 and 29 are then also in their fully extended position and tee 31 is then located within saddle 33*a*.

The resilience of pipes 28 which has been mentioned and their flexibility are essential to the securement of the header 17 in its operating position. In part, the elbows 24 and 25 also have some elasticity. Alternatively or additionally, the arms 38 which carry detent blocks 36 may be deflected toward each other as shown in FIG. 10 and, of course, the detent blocks themselves have some elasticity. In general, however, the pipes 28 which are in the order of 8 feet long can be deflected or beam loaded to provide the movement into and out of recesses 36*a*. Pipes 28 are typically between 3 and 4 inches in diameter; between 1 and 2 inches of deflection is required so that the blocks 36 adequately extend around pipes 28 as shown in FIG. 7.

As shown in FIG. 4, the ends 36*c* of blocks 36 which are remote from wall 12 are extended and function as abutments to prevent overtravel of the blocks after the header 17 is in its lower operating position.

The operation of the hoist arm 42 between pipes 28 is important to the present invention in that the entire mechanism is symmetrical about its centerline and there are no angular other than normal forces applied to the rotary joints.

The operation of the cart including arm 42 requires the coordinated functioning of blocks 36 and bracket 33 including saddle 33*a*. In placing header 17 in the downward position, the cam surfaces 36*b* of blocks 36 must promptly engage pipes 28 as described to ensure that the lower tee 31 does not engage saddle 33*a* but instead clears or passes over saddle 33*a* and engages bracket 33 as shown in full lines in FIG. 3. Tee 31 will then be moved downwardly properly into saddle 33*a* as shown in FIG. 4.

However, in lifting header 17 from its lower position, the tee 31 must continue to be held by saddle 33*a* until pipes 28 have moved out of recesses 36*a* of blocks 36 and are being held apart by the cam surfaces 36*b* of the blocks. That is, if tee 31 becomes disengaged from saddle 33*a* before pipes 28 have reached cam surfaces 36*a*, the pipes 28 and 29 will remain interlocked in their extended position and bind as the arm 42 swings upwardly. This possibility is readily avoided or overcome, and is described to assure an understanding of the operation of the invention. The pipes 28 and blocks 36 comprise a detent mechanism and arms 38 function as a lever. The flexibility of pipes 28 uniquely provides the bias necessary for the mechanism. However, other biasing means can be provided. For example, the arms 38 may have some flexibility although not necessarily such that they entirely can accommodate the displacement of blocks 36 toward and away from each other as would be required.

As a further consideration, it should be understood that the elasticity referred to must be substantially permanent. Generally, any elastic metals would be corroded away in the 20–50 year service life which is generally expected of sewage treatment tank equipment. Dual pipes 42 which are of a wound glass filament reinforced epoxy resin have been found to provide adequate elasticity when used with molded urethane elbows 22–25. The elbows 22 and 23 and elbows 24 and 25 are held together by corrosion resistant rods 37. Rods 37 may be fabricated of stainless steel (including the nuts at their ends).

Various embodiments of the invention may be carried out within the scope of the following claims wherein the bracket 33 and saddle 33*a* are referred to as abutments. Also in the claims, header 17 is considered to include tee 31 and pipe 29 is considered to include arms 38 and rod 39. Similarly, resilient detent means is intended to include any means securing the upper and lower pipes in their extended position and which is selectively releasable and engageable merely by the additional force which is required to overcome the resilience of the detent means. It should also be noted that the upper and lower positions of the header are similar; that is, the header is not turned upside down in its upper position but has substantially the same orientation at all times.

I claim:

1. In an air diffusion system for an aeration tank having an air supply and a walkway alongside the tank, said system including upper and lower air supply pipes, a horizontal header fixed and connected to the lower end of the lower pipe, said upper and lower pipes having an interconnecting rotary joint and the upper of said pipes having a fixed rotary joint for connection to the air supply whereby the lower pipe and header are adapted to be raised and lowered in an arc about said fixed joint so that the header can be disposed either in its operating position within the tank directly below the fixed joint or in a similar position above the walkway for servicing, said pipes and interconnecting rotary joint including resilient detent means adapted to secure the upper and lower pipes in their extended position and the header in its operating position, and fixed abutment means engageable by the header in approaching and leaving its operating position and disposed to secure the header laterally in its operating position, the resilient detent means being releasable upon raising of the lower pipe and header and reengageable and operable to guide the header into position between said abutments upon relowering of the lower pipe and header.

2. An air supply and maintenance system for lowering and securing an air diffuser header in a lower operating position within a tank having a sidewall and for releasing the header and lifting the same to a similar upper position where it is accessible for servicing above the tank sidewall, said system including apparatus positionable above the tank sidewall and having a lifting arm extending therefrom and a latch device at the outer end of said arm; said system further comprising dual pipes having rotary air supply joints, a support pipe extending from said header and connected to one of said joints, the other of said joints being fixed generally intermediate said positions, resilient detent means including said dual pipes and a lever extending from said support pipe to engage said dual pipes, first and second abutments fixed in said tank, said latch being engageable with said lever to swing and lower the header downwardly toward its lower position, said resilient detent means limiting relative movement of said pipes so that the header in moving to said lower position first passes directly over the second abutment to engage the first abutment and is then moved downwardly therebetween where it is secured in its lower position, said second abutment being disposed to effect release of said resilient detent means during the initial upward movement of said lift arm as it pulls said lever laterally away from the tank sidewall and lifts the header from between the first and second abutments.

3. The system of claim 2 wherein the header and the pipes are of a lightweight, elastic epoxy resin and each rotary joint comprises two elbows and an intermediate tee of a plastic such as urethane and the elbows of each joint are secured together by tie rods of a corrosion-resistant material such as stainless steel.

4. In combination with an air diffusion system for an aeration tank having an air supply and a walkway alongside the tank, said system including upper and lower air supply pipes, a horizontal header fixed and connected to the lower end of the lower pipe, said upper and lower pipes having an interconnecting rotary joint and the upper of said pipes having a fixed rotary joint for connection to the air supply whereby the lower pipe and header are adapted to be raised and lowered in an arc about said fixed joint so that the header can be disposed either in its operating position within the tank below the fixed joint or in a similar position above the walkway for servicing: means for raising and lowering the lower pipe and header and for securing the header in its operating position comprising (1) a horizontal lift rod associated with the lower pipe (2) resilient detent means associated with the upper and lower pipes and interconnecting rotary joint, (3) a hoist cart adapted to be positioned on the walkway adjacent to said fixed joint and having a powered lift arm, one end of the lift arm being pivotally mounted on the cart, the other end of the lift arm being pivotally engageable with said lift rod, and (4) fixed abutment means engageable by the header in approaching and leaving its operating position and disposed to secure the header laterally in its operating position, the resilient detent means being releasable upon raising of the lower pipe and header and reengageable and operable to guide the header into position between said abutments upon relowering of the lower pipe and header.

5. The combination of claim 4 wherein the upper of said pipes are of a relatively elastic material and the resilient detent means includes (a) the upper of said pipes referred to and (b) cam members associated with the lower pipe and engageable with the upper of said pipes.

6. The combination of claim 4 wherein the axes of the rotary joints and the pivot axes of the lift arm are parallel to the header and substantially define a parallelogram.

7. The system of claim 5 wherein (a) the upper of said pipes comprises two parallel pipes (b) the cam members fit between said dual pipes and elastically deform the same in opposed relation and (c) the rotary joints include tension rods which in effect join the corresponding ends of said dual pipes.

8. Diffuser apparatus for an aeration tank having an air supply outlet at the top of one wall and comprising (1) a diffuser header, (2) rotary jointed hanger pipes, (3) a steady bracket for laterally positioning said header in the tank below said outlet and (4) a hoist adapted to be placed at said outlet for lifting the header from the tank such as for servicing the diffusers; said header (1) having a support tee and a series of diffusers, said hanger pipes (2) including parallel spaced upper pipes, a single lower pipe, upper rotary joints connecting two corresponding ends of said spaced pipes to said air supply outlet and lower rotary joints connecting the corresponding other ends of said spaced pipes to the upper end of said single pipe, the upper end of said single pipe having a lift bracket extending upwardly between said spaced pipes and including a lift rod and detent blocks, said blocks having opposite recesses in which said spaced pipes are normally received such that with the header disposed in the steady bracket said blocks serve to maintain the pipes in their fully extended position, said bracket (3) including opposite abutments between which the header is normally disposed for its lateral securement in its lower operative position, said hoist (4) including a cart and a powered hoist arm, one end of the arm being pivotally mounted on the cart and the other end having a closeable hook; (A) said hoist arm being adapted to swing downwardly and cause the hook to engage said rod and to swing upwardly initially away from the tank wall, on abutments of said steady bracket being disposed to restrain movement of the header until the blocks have become disengaged from the spaced pipes whereupon with the further lifting of the arm the header follows normally to the upper position, (B) said hoist arm being also adapted to swing downwardly to replace the header in the tank after servicing of the diffusers, the corresponding ends of said blocks having cam faces so that as the header approaches the bracket the blocks engage the spaced pipes and cause the header to swing about the upper rotary joint and engage the other abutment, the further downward movement of the hoist arm causing the header to move downwardly between the abutments as the spaced pipes are first spread apart by the cams and then spring together into the recesses of the blocks.

9. Diffuser apparatus for an aeration tank having an air supply outlet at the top of one wall and comprising (1) a diffuser header, (2) rotary jointed hanger pipes, (3) a steady bracket for laterally positioning said header in the tank below said outlet and (4) a hoist adapted to be placed at said outlet for lifting the header from the tank such as for servicing the diffusers; said header (1) having a support tee, and a series of diffusers said hanger pipes (2) including parallel spaced upper pipes, a single lower pipe, upper rotary joints connecting two corresponding ends of said spaced pipes to said air supply outlet and lower rotary joints connecting the corresponding other ends of said spaced pipes to the upper end of said single pipe, the lower end of said single pipe having a lift bracket extending upwardly between said spaced pipes and including a lift rod and detent blocks, said blocks having opposite recesses in which said spaced pipes are normally received such that with the header disposed in the steady bracket said blocks serve to maintain the pipes in their fully extended position, said bracket (3) including an upper abutment and a lower saddle in which the header is normally disposed for its lateral securement in its lower operative position, said hoist (4) including a cart and a powered hoist arm, one end of the arm being pivotally mounted on the cart and the other end having a closeable hook; (A) said hoist arm being adapted to swing downwardly and cause the hook to engage said rod and to swing upwardly initially away from the tank wall, the saddle of said steady bracket being disposed to restrain movement of the header until the blocks have become disengaged from the spaced pipes whereupon with the further lifting of the arm the header follows normally to the upper position (B) said hoist arm being also adapted to swing downwardly to replace the header in the tank after servicing of the diffusers, the corresponding ends of said blocks having cam faces so that as the header approaches the bracket the blocks engage the spaced pipes and cause the header to swing about the upper rotary joint and engage the abutment, the further downward movement of the hoist arm causing the header to move downwardly into the saddle as the spaced pipes are first spread apart by the cams and then spring together into the recesses of the blocks.

10. The method of securing and removing one type of diffuser header in and from an aeration tank which type includes upper and lower air supply pipes connected by an intermediate rotary joint which method comprises (1) providing the air supply pipes with resilient detent means and the tank with first and second abutment means to be selectively engaged by the header in its lower position, and (2) adjusting said abutment means so that in lowering the header the resilient detent means causes the header to engage the first abutment and then move downward to fit between the two abutments as the resilient detent means becomes engaged and so that in raising the header the second abutment causes the resilient detent means to be fully disengaged before the header becomes disengaged from the second abutment means.

* * * * *